(12) United States Patent
Luttinen et al.

(10) Patent No.: US 7,490,840 B2
(45) Date of Patent: Feb. 17, 2009

(54) STEERING AND SUSPENSION SYSTEM FOR A VEHICLE

(75) Inventors: James L. Luttinen, Brighton, MI (US); Juergen W. Siebeneick, Oberwesel-Dellhofen (DE)

(73) Assignee: GM Global Technology Operations, Inc., Detroit, MI (US)

( * ) Notice: Subject to any disclaimer, the term of this patent is extended or adjusted under 35 U.S.C. 154(b) by 520 days.

(21) Appl. No.: 11/159,645

(22) Filed: Jun. 23, 2005

(65) Prior Publication Data

US 2006/0290088 A1 Dec. 28, 2006

(51) Int. Cl.
*B62D 7/18* (2006.01)

(52) U.S. Cl. ............................ 280/93.512; 280/124.126

(58) Field of Classification Search ............ 280/93.512, 280/124.126, 124.145, 124.146, 124.154
See application file for complete search history.

(56) References Cited

U.S. PATENT DOCUMENTS 4,844,505 A 7/1989 Higuchi
4,995,633 A 2/1991 Santo
6,131,932 A * 10/2000 Bunker ........................ 280/88
6,880,841 B2 * 4/2005 Wang et al. ............ 280/93.512
2003/0234504 A1 12/2003 Frantzen
2004/0026885 A1 * 2/2004 Lin ........................ 280/93.512

\* cited by examiner

*Primary Examiner*—Eric Culbreth

(57) ABSTRACT

The present invention concerns a steering and suspension system of a vehicle. The system may include a strut extension member having a strut clamp arm mounted to a strut assembly, an upper extension support arm extending from the strut clamp arm, an extension fork with first and second arms extending from the strut clamp arm, and a lower extension support arm extending from the extension fork. Also, a steering knuckle has an upper portion pivotally coupled to the upper extension support arm, and a lower portion pivotally coupled to the lower extension support arm. A lower control arm has an outboard portion with a control arm mounting bore therethrough, and a compliant hinge joint includes a first joint associated with the first arm, a second joint associated with the second arm, and a shaft extending through the first joint, the second joint and the mounting bore.

18 Claims, 6 Drawing Sheets

STEERING AND SUSPENSION SYSTEM FOR A VEHICLE

BACKGROUND OF INVENTION

The present invention relates generally to vehicle steering and suspension systems and, in particular, to strut-type vehicle steering and suspension systems.

Many automotive vehicles today employ a type of front suspension commonly known as a McPherson strut suspension. This type of suspension includes a strut assembly, with an upper strut mount affixed to a vehicle frame or body and a lower end affixed to a steering knuckle. The lower end of the steering knuckle also attaches, via a ball joint, to a lower control arm, which is hinged to the vehicle frame or body. While this conventional suspension works well for many vehicle applications, it creates a spindle length—the distance from the wheel center plane to steer axis along the wheel rotation axis—that is larger than desirable. The steer axis is located away from the wheel center plane due to the fact that, with this suspension, it is defined by the ball joint and upper strut mount location. This large spindle axis undesirably increases steering system loads when tractive forces (front wheel drive), road profile impact forces, or rotating assembly imbalance forces are applied. This undesirable increase in steering system loads is particularly noticeable on front wheel drive vehicles with high-powered engines. On these types of vehicles, traction steer concerns may become apparent during combined acceleration and turn events.

While a different type of suspension may be provided for such high-powered vehicles, this may require substantial changes to the vehicle's frame or body to accommodate this different suspension. The cost to make these changes on an existing vehicle may be prohibitive, leaving one only the choice of the conventional suspension. Consequently, it is desirable to improve the suspension and steering performance on vehicles where the frame or body has already been designed specifically for a McPherson strut suspension without having to substantially modify the frame or body of that vehicle, and while remaining generally within the packaging space of the conventional McPherson strut suspension.

Some have attempted to provide a different suspension that may be employed with a vehicle that has been designed generally for a strut suspension while also shortening the spindle length. Generally, these attempts are directed to creating a different steering axis than is defined by a conventional McPherson strut-type suspension. While the steering axis may change, these designs have had undesirable drawbacks. For some, the design of the modified steering and suspension system is much more complicated, costly and/or much heavier than is desirable. For others, the design may have less than desirable durability characteristics, or be more limited in the types and amount of adjustments that can be made to tune the suspension to its most desirable performance characteristics.

It is desirable, therefore, to provide a steering and suspension system that can be employed with a vehicle frame or body designed for a McPherson strut suspension, yet has a shorter spindle length to provide improved performance, while also minimizing other drawbacks, such as being cost effective and providing good durability over the life of the vehicle.

SUMMARY OF INVENTION

An embodiment of the present invention contemplates a steering and suspension system of a vehicle. The steering and suspension system includes a strut extension member having a strut clamp arm adapted for mounting to a strut assembly, an upper extension support arm extending from the strut clamp arm, an extension fork extending from the strut clamp arm and including a first arm spaced from a second arm, and a lower extension support arm extending from the extension fork, and wherein the first arm includes a first mounting bore and the second arm includes a second mounting bore. Also, a steering knuckle may have an upper portion pivotally coupled to the upper extension support arm, and a lower portion pivotally coupled to the lower extension support arm. A lower control arm may have an outboard portion with a control arm mounting bore therethrough that is located between and aligned with the first mounting bore and the second mounting bore, and a compliant hinge joint may include a first joint located in the first mounting bore, a second joint spaced from the first joint and located in the second mounting bore, and a shaft extending through the first joint, the second joint and the mounting bore.

An embodiment according to the present invention also contemplates a steering and suspension system of a vehicle that may include a strut extension member having a strut clamp arm adapted for mounting to a strut assembly, an upper extension support arm extending from the strut clamp arm, an extension fork extending from the strut clamp arm and including a first arm spaced from a second arm, and a lower extension support arm extending from the extension fork, and wherein the first arm includes a first mounting bore and the second arm includes a second mounting bore. The system may also include a steering knuckle having an upper portion pivotally coupled to the upper extension support arm, and a lower portion having a lower knuckle joint including a ball joint mounted to one of the lower portion of the steering knuckle and the lower extension support arm and a pin extending between and operatively engaging the ball joint and an other of the lower portion of the steering knuckle and the lower extension support arm to pivotally couple the steering knuckle to the strut extension member. The system may also include a lower control arm having an outboard portion with a control arm mounting bore therethrough that is located between and aligned with the first mounting bore and the second mounting bore, and a compliant hinge joint including a shaft extending through and operatively engaging the first mounting bore, the second mounting bore, and the control arm mounting bore.

An embodiment according to the present invention also contemplates a compliant hinge for use in a steering and suspension system of a vehicle, with the steering and suspension system including a wheel center of rotation. The compliant hinge joint may include a strut extension member having a strut clamp arm adapted for mounting to a strut assembly, and an extension fork extending from the strut clamp arm and including a first arm adapted to be located forward of the wheel center of rotation and a second arm adapted to be located aft of the wheel center of rotation, wherein the first arm includes a first mounting bore and the second arm includes a second mounting bore. The hinge may also include a lower control arm having an outboard portion with a control arm mounting bore therethrough that is located between and aligned with the first mounting bore and the second mounting bore, and a compliant hinge joint including a first joint having a first bushing mounted in the first mounting bore, a second joint spaced from the first joint and located in the second mounting bore, and a shaft extending through the first bushing, the second joint and the mounting bore.

The assembly in accordance with the present invention advantageously provides a steering and suspension system with a short spindle length, where a steer axis defined by the system is relatively close to a wheel centerline plane.

An advantage of an embodiment of the present invention is that, with a relatively short spindle length, traction steer concerns that may arise during combined acceleration and turn events are minimized. Also, road profile impact isolation may be improved and high speed shake due to rotating assembly imbalances may be reduced. And, with a reduced steer axis inclination, the camber angle of the tire on the outside of a turn may be improved, which in turn, may increase the lateral force generation.

Another advantage of an embodiment of the present invention is that the steering and suspension system can generally be employed with a vehicle having a frame or body that is configured to accept a conventional McPherson strut-type suspension. The interchangeability of the steering and suspension system with a McPherson strut suspension system minimizes the costs associated with providing the option of a higher performance suspension for an existing vehicle. Moreover, this lends itself to providing different modular assemblies at a vehicle assembly plant, which allows both the steering and suspension system of the present invention and a conventional McPherson strut suspension to be selectively assembled to different vehicles coming down the same assembly line. In particular, the various components can be assembled into the same types of subassemblies and then assembled to the vehicle in essentially the same way as with a conventional McPherson strut suspension.

An additional advantage of an embodiment of the present invention is that, since the steer axis is now independent of the upper strut mount location, the system design can be adjusted for caster, king pin inclination (KPI), spindle offset, scrub and spindle length without requiring the alteration of the vehicle frame or body. This provides significant adjustability to tune the suspension and steering to have the most desirable qualities for the particular vehicle. Moreover, the steering and suspension system of the present invention allows for easier assembly by being able to accept misalignment and tolerances of components, while still being able to assemble the components together.

A further advantage of an embodiment of the present invention is that upper and lower attachment joints connecting the strut extension member to the steering knuckle and the strut extension member attachment to the lower control arm are configured to provide durability of the components over the life of the vehicle, while still allowing for tuning the suspension and steering system to provide the desired handling characteristics.

DETAILED DESCRIPTION

Figure 1:
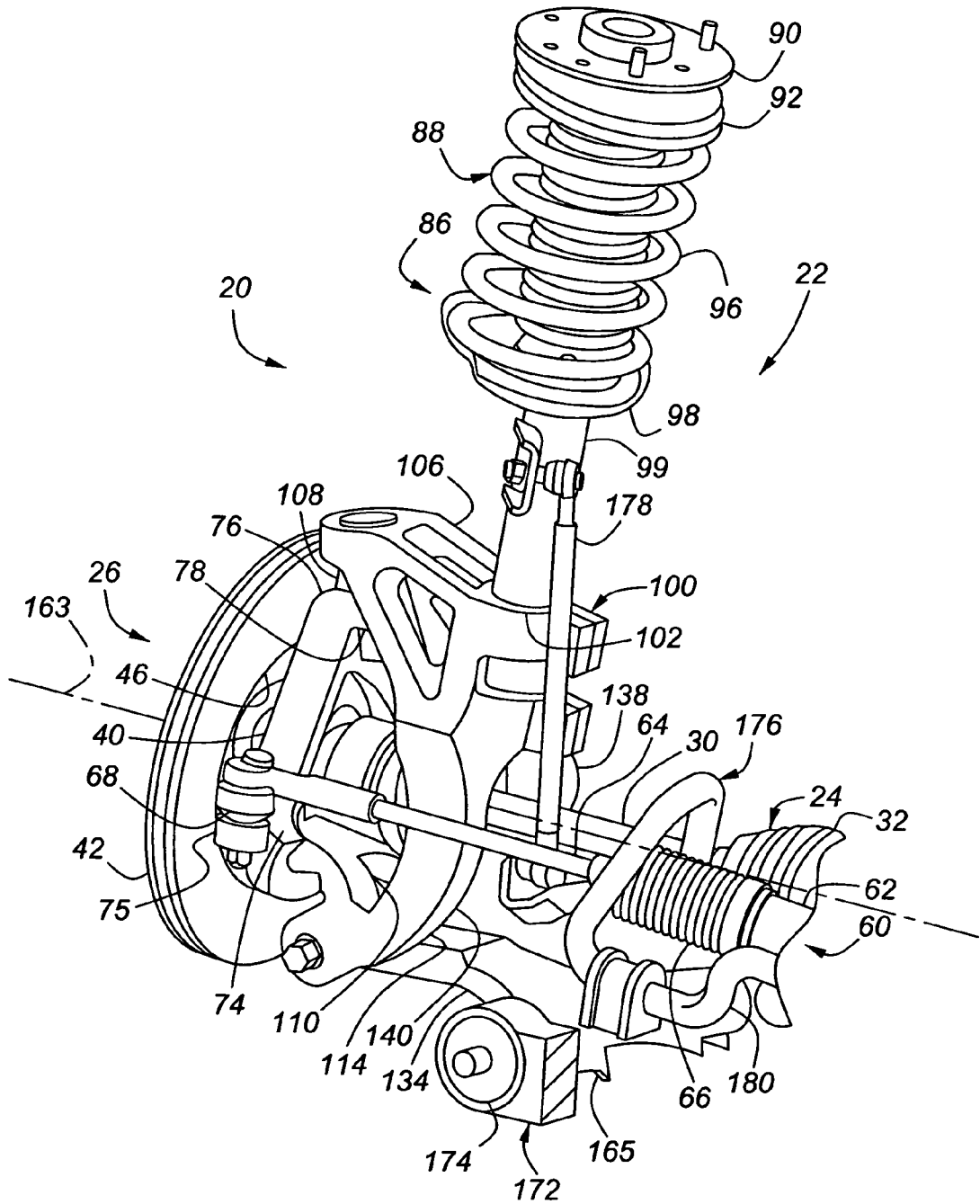
FIG. 1 is a perspective view looking forward and outboard of a portion of a suspension and steering system on a forward, left side of a vehicle, in accordance with a first embodiment of the present invention.
Figure 2:
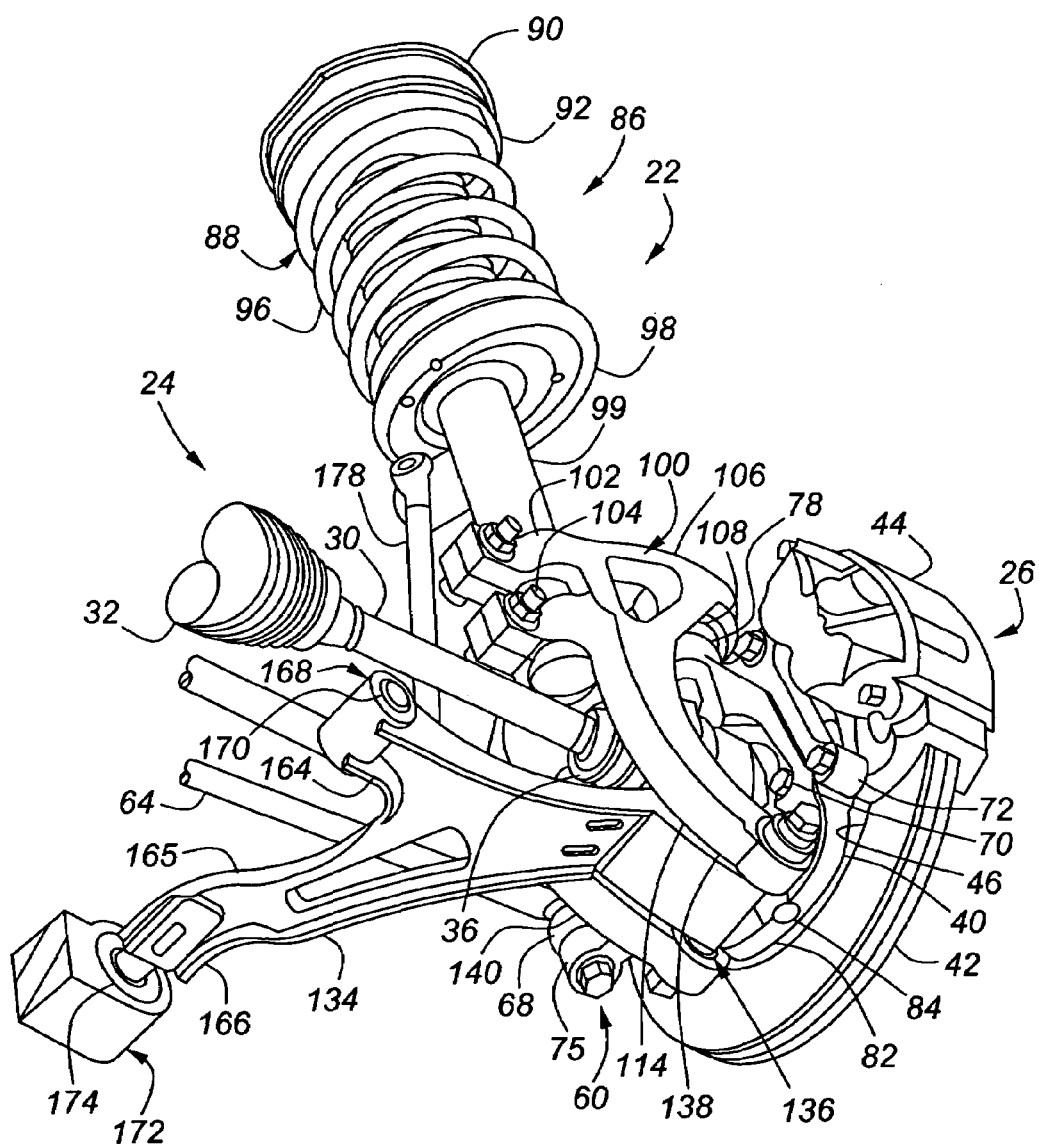
FIG. 2 is a perspective view similar to FIG. 1 but looking outboard, aft, and up.
Figure 3:
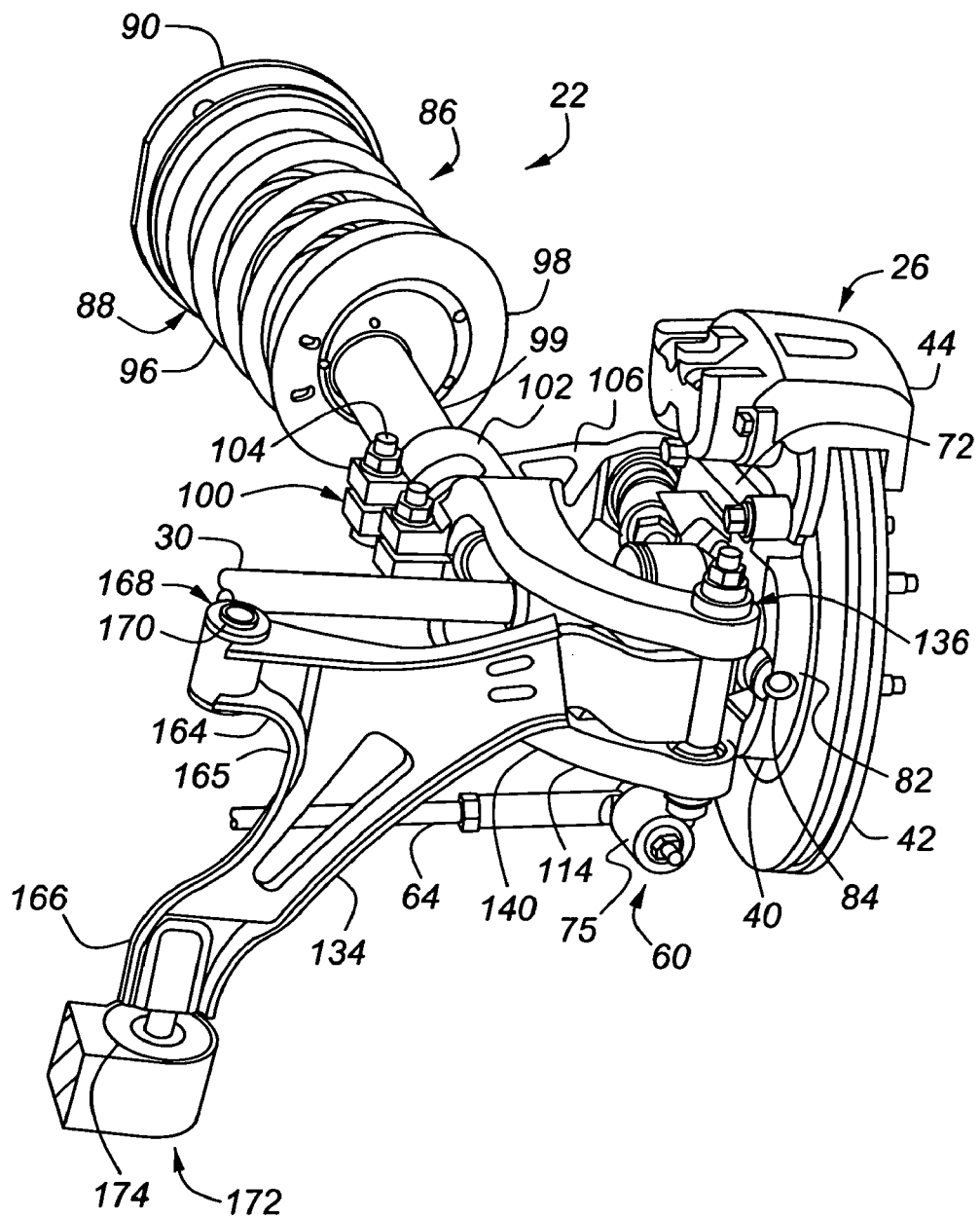
FIG. 3 is a perspective view similar to FIG. 2, but looking more upward at the suspension and steering system.
Figure 4:
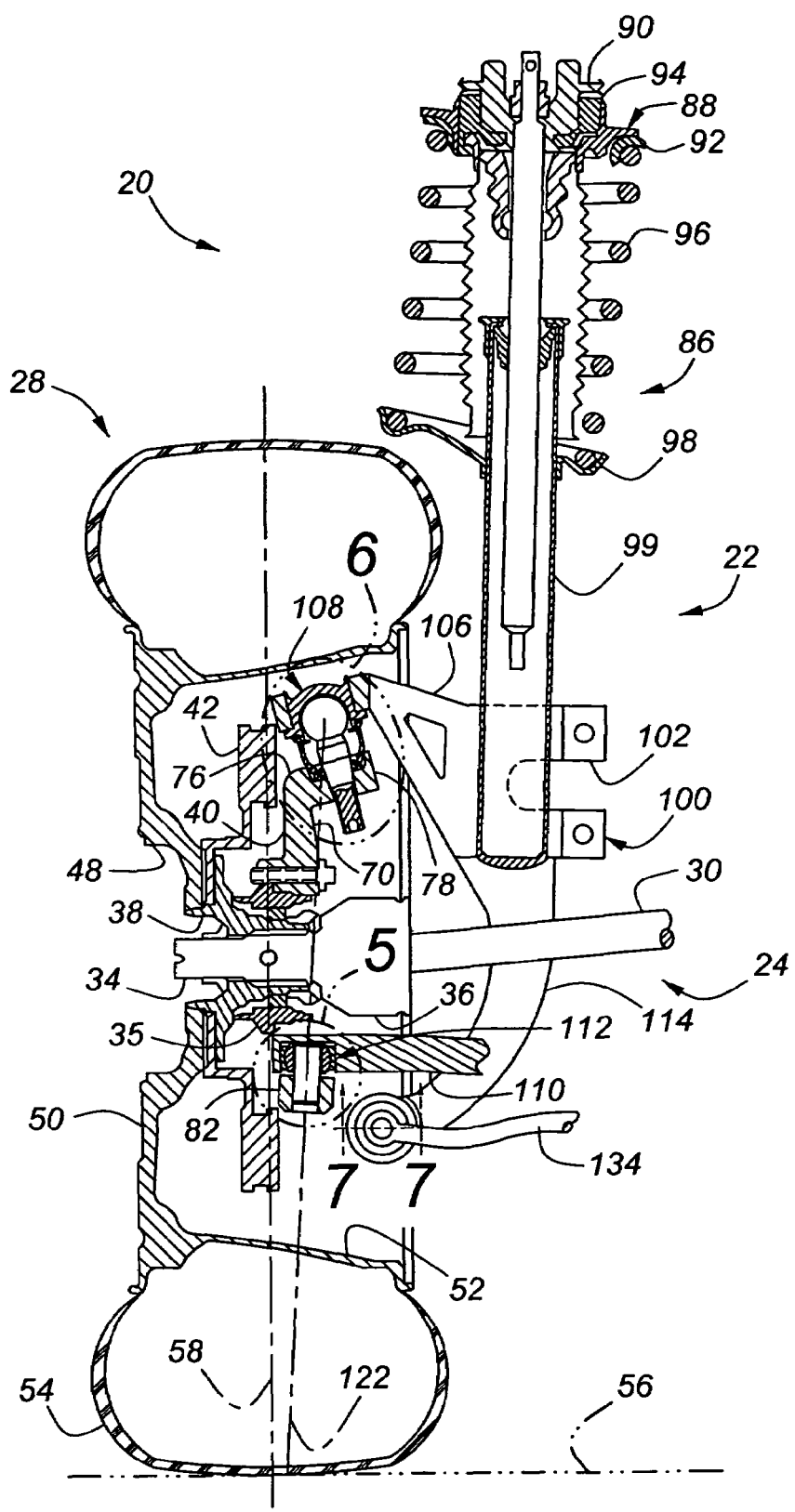
FIG. 4 is an elevation view, in partial cross-section, of the suspension and steering system of FIG. 1.

Referring now to FIGS. 1-8, which illustrate a first embodiment of the present invention, a portion of steering and suspension system 22, as would be employed on a front left corner of a vehicle 20, are shown. While these figures only illustrate the front left portion, the front right portion is essentially the same and so will not be illustrated herein. The steering and suspension system 22 cooperates with a driveline system, indicated generally at 24, a braking system, indicated generally at 26, and a wheel and tire assembly, indicated generally at 28.

The driveline system 24 includes a half shaft 30 connected at an inboard end to a transaxle (not shown) via a first constant velocity (CV) universal joint 32. An outboard end of the half shaft 30 connects to a drive axle 34 via a second CV joint 36. Wheel bearings 35 mount about a wheel hub 38 that surrounds the drive axle 34 and allow the half shaft 30 to cause the wheel hub 38 and wheel and tire assembly 28 to rotate relative to the suspension and steering system 22. This driveline system 24 can be conventional, if so desired. The wheel hub 38, via the wheel bearing, is supported by a steering knuckle 40, which is discussed below.

The braking system 26 includes a brake rotor 42, which is mounted about and rotates with the wheel bearing 34, and a brake caliper 44, which is mounted on the steering knuckle 40 and extends about the disk-shaped surfaces of the brake rotor, generally the same as a conventional brake arrangement. The disk portion of the brake rotor 42 has an inside diameter 46.

The wheel and tire assembly 28 includes a wheel 48 having a spider (center) portion 50, which mounts to the wheel hub 38 and brake rotor 42, and a rim portion 52, which mounts to and supports a tire 54. The wheel and tire assembly 28, when mounted on the vehicle 20 and supporting it on a surface, indicated generally by the phantom line 56 in FIG. 4, defines a wheel centerline plane, indicated generally by the center line 58 in FIG. 4.

The steering portion, indicated generally at 60, of the steering and suspension system 22 may include a rack and pinion housing 62 with a rack (not shown) connected to a tie rod 64 via a ball joint 66. The tie rod 64, in turn, connects to the steering knuckle 40 via a second ball joint 68. In general, the steering portion 60 of the steering and suspension system 22 may be conventional, with the exception that the steering knuckle 40 has a different configuration. In addition, with the change in geometry of the steering knuckle 40 from that of a conventional McPherson strut suspension, which causes a steering axis (discussed below) to be located more outboard, the steering rack (not shown) may need to increase in length somewhat.

The steering knuckle 40 has a central portion 70 that mounts around the wheel bearings 35, a forward arm 72 upon which the brake caliper 44 is mounted, and a rearward arm 74 including a steering flange 75 to which the ball joint 68 of the tie rod 64 mount. An upper portion 76 of the steering knuckle 40 includes an upper mounting flange 78 within which is located an upper joint receptacle 80. A lower arm 82 of the steering knuckle 40 includes a lower joint receptacle 84.

The suspension portion 86 of the steering and suspension system 22 includes a strut assembly 88, which has an upper strut mount 90 that is mounted to a strut tower (not shown) that is part of the vehicle frame or body (not shown). Preferably, the strut tower is conventional and located at its conventional location for interchangeability with a McPherson strut suspension in the particular vehicle. The upper strut mount 90 includes an upper spring seat 92 and a strut mount bearing (also called a spring seat bearing) 94. A coil spring 96 mounts between the upper spring seat 92 and a lower spring seat 98. The strut assembly 88 also includes a strut shock absorber assembly 99. Of course, as with a conventional McPherson strut suspension, the coil spring 96 supports the weight of the vehicle 20 while the shock absorber assembly 99 damps the vertical motion of the vehicle 20. And, in fact, if so desired, the strut assembly 88 may be the same as the strut assembly in the conventional McPherson strut suspension for that vehicle. On the other hand, one of the advantages with the steering and suspension system 22 is that the strut mount bearing 94—which is needed in conventional McPherson strut suspensions to allow its spring to rotate at one end when the vehicle steers—may be eliminated, if so desired.

The suspension portion 86 of the steering and suspension system 22 also includes a strut extension member 100. The strut extension member 100 has strut clamp arms 102 that are secured to the lower end of the strut assembly 88 by mounting bolts 104. The strut extension member 100 also includes upper support arms 106 that extend from the strut clamp arms 102 and mount to the upper mounting flange 78 of the steering knuckle 40 via a compression loaded upper ball joint 108 (discussed below). Lower support arms 110 mount to the lower arm 82 of the steering knuckle 40 via a lower joint assembly 112 (discussed below). The lower support arms 110 extend from an extension fork 114, which also extends from the strut clamp arms 102 and forms a part of the strut extension member 100.

Figure 6:
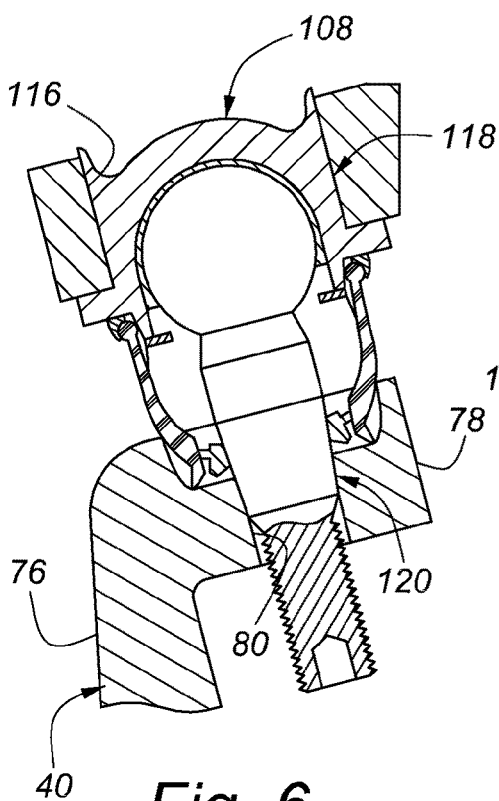
FIG. 6 is a partial cross-sectional view, on an enlarged scale, of encircled area 6 in FIG. 4.

The upper support arms 106 of the strut extension member 100 have an upper receptacle 116 within which is mounted a portion of the compression loaded upper ball joint 108, (best seen in FIG. 6). The upper ball joint 108 also mounts to the upper joint receptacle 80 of the steering knuckle 40. This upper ball joint 108 carries the vertical loads generally through its bearing surface while providing for the required rotation and pivoting of the strut extension member 100 relative to the steering knuckle 40 during assembly and vehicle operation. Preferably, a ball and socket portion 118 of the upper ball joint 108 is retained in the upper receptacle 116 of the strut extension member 100, while a stud portion 120 of the upper ball joint 108 is mounted in the upper joint receptacle 80 of the steering knuckle 40. By employing a compression loaded upper ball joint 108 with this orientation, a relatively lower amount of precision in aligning the components is required during assembly—it allows for misalignment due to component manufacturing variation (tolerances) and component deflection under service loads. Moreover, since this upper ball joint 108 defines an upper end of a steer axis, indicated generally by center line 122 in FIG. 4, it is preferably located close to the brake rotor 42 inside the rim portion 52 of the wheel 48 in order to maintain the steer axis 122 close to the wheel centerline plane 58.

Figure 5:
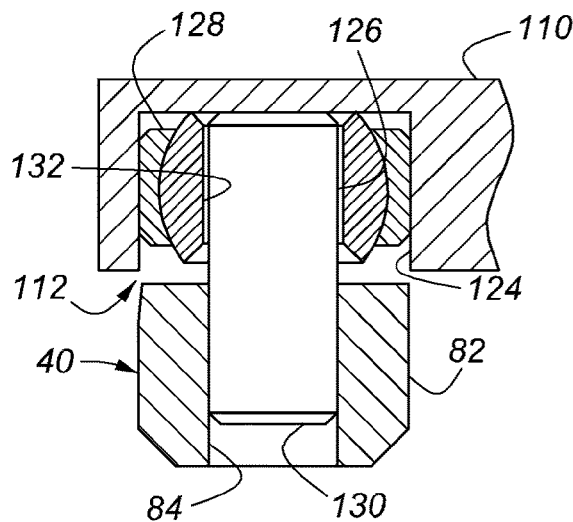
FIG. 5 is a partial cross-sectional view, on an enlarged scale, of encircled area 5 in FIG. 4.

The lower support arms 110 of the strut extension member 100 have a lower receptacle 124 within which is mounted a portion of the lower joint assembly 112, (best seen in FIG. 5). The lower joint assembly 112 also connects to the lower joint receptacle 84 of the steering knuckle 40 and preferably includes a rotating joint portion 126 inside of a ball joint portion 128. The rotating joint portion 126 includes a pin 130 extending between a cylindrical cavity 132 in the lower receptacle 124 and the lower joint receptacle 84 and is used to allow the steering knuckle 40 to pivot relative to the strut extension member 100 when the vehicle 20 is steering. The ball joint portion 128 surrounds the portion of the pin 130 that extends into the lower receptacle 124 and is retained in the lower receptacle 124. Several advantages are obtained by having the lower joint assembly 112 include both a rotating joint portion 126 and a ball joint portion 128. The rotating joint portion 126 enables straight vertical assembly of the strut extension member 100 onto the steering knuckle 40, while the ball joint portion 128 allows for misalignment that may exist due to component manufacturing variation (tolerances) and misalignment created due to component defection under service loads. Moreover, since this lower joint assembly 112 defines a lower end of the steer axis 122, its outboard location reduces the spindle length. Preferably, this lower joint assembly 112 is adjacent to or between the inside diameter 46 of the brake rotor 42 and the outer surface of the wheel bearings 35 in order to be as far outboard as possible.

Figure 7:
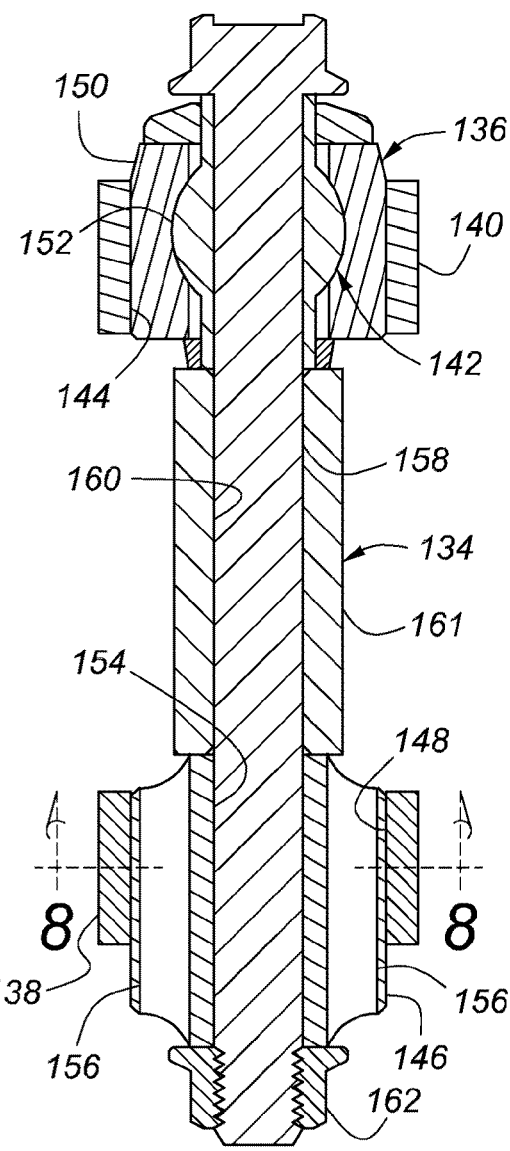
FIG. 7 is a cross-sectional view, taken along line 7-7 in FIG. 4.
Figure 8:
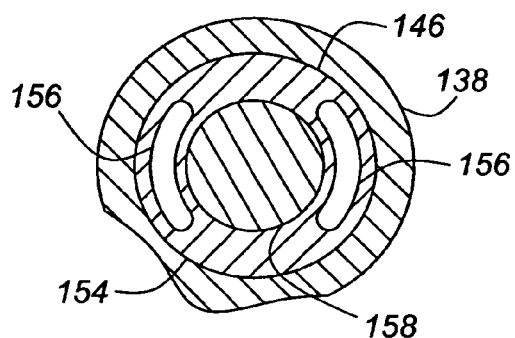
FIG. 8 is a cross-sectional view, taken along line 8-8 in FIG. 7.

The extension fork 114 of the strut extension member 100 includes a forward arm 138 spaced from a rearward arm 140 that each connect to a lower control arm 134 via a compliant hinge joint 136, (best seen in FIGS. 7 and 8). The compliant hinge joint 136 includes a cross axis ball joint 142, which is mounted in a bore 144 through the rearward arm 140, and a voided bushing 146, which is mounted in a bore 148 through the forward arm 138. The ball joint 142 includes a sleeve 150 that is press fit into the bore 144, within which is mounted a ball element 152. A shaft of a pivot bolt 158 extends through the center of the ball element 152. The voided bushing 146 includes a main body 154 that is press fit into the bore 148, with the pivot bolt 158 extending through its center. The main body 154 has a pair of voids 156 that are preferably located above and below the pivot bolt 158 in order to create compliance in the bushing 146 in the vertical direction. The pivot bolt 158 also extends through a bore 160 in an outboard portion 161 of the lower control arm 134 and is secured with a nut 162 in order to retain the strut extension member 100 to the lower control arm 134 while still allowing for pivoting between the two.

This compliant hinge joint 136, by connecting the strut extension member 100 to the lower control arm 134, acts to prevent strut rotation. Also, preferably, the ball joint 142 and bushing 146 are spaced apart fore and aft so that one is forward of a wheel center of rotation—indicated generally by centerline 163 in FIG. 1—and the other is aft of the wheel center of rotation 163. The wheel center of rotation 163 is simply the axis about which the wheel and tire assembly 28 rotates. The longer moment arm created by spacing the ball joint 142 and bushing 146 apart improves the ability to react moments (due to fore-aft loads created when the vehicle 20 is accelerating or braking) induced in the steering and suspension system 22 through the lower control arm 134 to the vehicle frame or body. These separate, spaced apart joints 142, 146, then assure good durability characteristics over the life of the vehicle. Moreover, with the two portions of the joint 136 being on either side of the wheel center of rotation 163, the lateral stiffness of each portion of the joint 136 may be tuned independent of the other when tuning the toe characteristics for lateral force operation, which gives an extra degree of freedom in tuning the suspension. The location and stiffness of the compliant hinge can be tuned to improve tractive and brake steer. In addition, the ball joint 142 transmits most of the fore-aft strut extension member loads directly to the lower control arm 134, thus avoiding unduly stressing the bushing 146. The vertical orientation of the bushing voids 156 enables side view rotation of the strut extension member 100 relative to the lower control arm 134, which allows for suspension vertical displacement. Furthermore, the bushing axial compliance enables clearance between the lower control arm 134 and extension fork 114 during assembly of this compliant hinge joint 136.

An inboard portion 165 of the lower control arm 134 includes two spaced apart arms, a front arm 164 and a rear arm 166, that each connect to the vehicle frame or body (not shown). The front arm 164 of the lower control arm 134 includes a pivotable joint 168 with a handling bushing 170, while the rear arm 166 of the lower control arm 134 includes a pivotable joint 172 with a comfort bushing 174. These two joints 168, 172 react the loads introduced into the lower control arm 134 by the compliant hinge joint 136. Each can be tuned independently to obtain the desired characteristics.

The steering and suspension system 22 may also include a stabilizer assembly 176. The stabilizer assembly 176 may include separate members 178 and 180 that attach to the vehicle frame or body at various locations. The stabilizer assembly 176 is preferably conventional and so will not be discussed further herein.

The steering and suspension assembly 22 disclosed herein provides for improved performance over a conventional McPherson strut suspension by reducing the spindle length, while allowing for substantial tuning to obtain the desired operating characteristics. In comparing this steering and suspension system 22 to a conventional McPherson strut suspension, the spindle length is significantly less, yet camber and toe can remain essentially unchanged, caster can be changed independent of a centerline axis of the strut and so do not need to change the frame or body structure to be accomplished, the king pin inclination (KPI) is more vertical for improved camber angle for the outside wheel during a vehicle turn, and scrub can be changed independent of the strut orientation.

Figure 9:
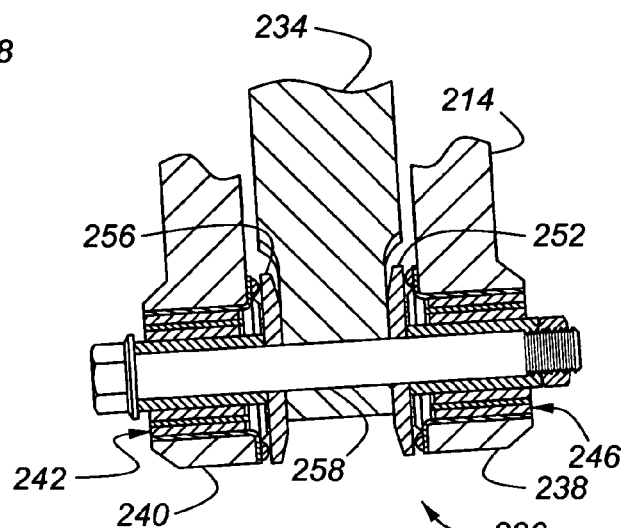
FIG. 9 is a cross-sectional view, similar to FIG. 7, but illustrating a second embodiment of the present invention.

Referring now to FIG. 9, a compliant hinge joint 236 in accordance with a second embodiment of the present invention is shown. In this embodiment, the compliant hinge joint 236 connecting the two arms 238, 240 of the extension fork 214 to the lower control arm 234 is made up of two spaced apart bushings 242, 246, rather than one bushing and one ball joint. A forward thrust washer 252 is mounted about the pivot bolt 258 between the forward arm 238 of the extension fork 214 and the lower control arm 234, and a rear thrust washer 256 is mounted about the pivot bolt 258 between the rearward arm 240 of the extension fork 214 and the lower control arm 234. As an option, the thrust washers 252, 256 can be formed integral with the lower control arm 234, if so desired. Also, optionally, there may be an additional thrust washer (not shown) on the forward side of the bushing 246 and/or an additional thrust washer (not shown) on the rear side of the bushing 242, in order to distribute the load transfer at braking and/or acceleration to both of the lower arms 238, 240.

While in the first embodiment, the ball joint 142 transmits fore-aft strut extension member loads directly to the lower control arm 134, in this second embodiment, the acceleration and braking forces are generally transferred through separate load paths. Forces generated due to vehicle braking are generally transferred through the forward thrust washer 252, adjacent to the forward bushing 246, while forces generated due to vehicle acceleration are generally transferred through the rear thrust washer 256, adjacent to the rear bushing 242. This configuration thus allows for the independent tuning of the longitudinal stiffness for vehicle braking and acceleration independent of each other.

Figure 10:
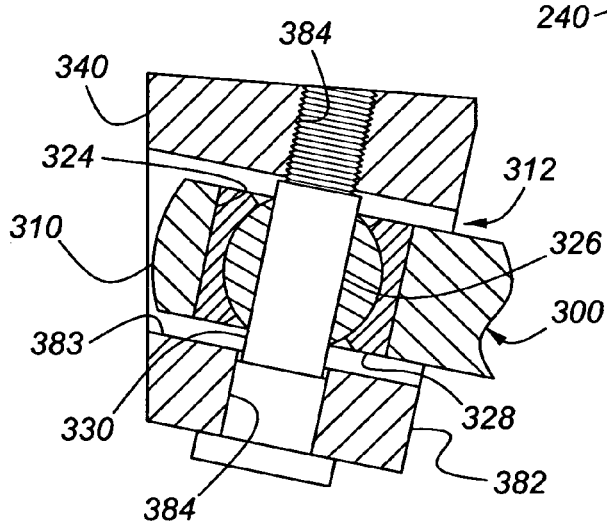
FIG. 10 is a cross-sectional view, similar to FIG. 5, but illustrating a third embodiment of the present invention.

Referring now to FIG. 10, a lower joint assembly 312 between the lower support arms 310 of the strut extension member 300 and the lower arm 382 of the steering knuckle 340 in accordance with a third embodiment of the present invention is shown. In this embodiment, the lower support arms 310 extend into a cavity 383 in the lower arm 382, with a ball joint portion 328 of the lower joint assembly 312 secured in a through-hole 324 in the lower support arms 310. The pin 330 of the rotating joint portion 326 extends through receptacles 384 in the lower arm 382, which are both above and below the lower support arms 310, as well as extending through the ball joint portion 328.

While certain embodiments of the present invention have been described in detail, those familiar with the art to which this invention relates will recognize various alternative designs and embodiments for practicing the invention as defined by the following claims.

What is claimed is:

1. A steering and suspension system of a vehicle comprising:
a strut extension member having a strut clamp arm adapted for mounting to a strut assembly, an upper extension support arm extending from the strut clamp arm, an extension fork extending from the strut clamp arm and including a first arm spaced from a second arm, and a lower extension support arm extending from the extension fork, and wherein the first arm includes a first mounting bore and the second arm includes a second mounting bore;
a steering knuckle having an upper portion pivotally coupled to the upper extension support arm, and a lower portion pivotally coupled to the lower extension support arm;
a lower control arm having an outboard portion with a control arm mounting bore therethrough that is located between and aligned with the first mounting bore and the second mounting bore; and
a compliant hinge joint including a first joint located in the first mounting bore, a second joint spaced from the first joint and located in the second mounting bore, and a shaft extending through the first joint, the second joint and the control arm mounting bore.

2. The steering and suspension system of claim 1 wherein the first joint includes a bushing located between the shaft and the first mounting bore.

3. The steering and suspension system of claim 2 wherein the second joint includes a ball element located between the shaft and the second mounting bore.

4. The steering and suspension system of claim 2 wherein the second joint includes a bushing located between the shaft and the first mounting bore.

5. The steering and suspension system of claim 4 wherein the first joint includes a first thrust washer mounted on the shaft and located between the first arm of the extension fork and the lower control arm, and a second thrust washer mounted on the shaft and located between the second arm of the extension fork and the lower control arm.

6. The steering and suspension system of claim 2 wherein the bushing has a main body that includes a pair of spaced apart voids extending therethrough.

7. The steering and suspension system of claim 1 further including a wheel center of rotation and wherein the first joint is located forward of the wheel center of rotation and the second joint is located aft of the wheel center of rotation.

8. The steering and suspension system of claim 1 wherein the lower portion of the steering knuckle is pivotally coupled to the lower extension support arm by a lower knuckle joint that includes a pin extending between and operatively engaging the lower portion of the steering knuckle and the lower extension support arm.

9. The steering and suspension system of claim 8 wherein the lower knuckle joint further includes a ball joint surrounding and operatively engaging the pin and mounted to the lower extension support arm.

10. The steering and suspension system of claim 8 wherein the upper portion of the steering knuckle is pivotally coupled to the upper extension support arm by an upper ball joint, and the upper ball joint and the pin define a steer axis for the steering and suspension system.

11. The steering and suspension system of claim 1 wherein the upper portion of the steering knuckle is pivotally coupled to the upper extension support arm by an upper ball joint.

12. The steering an suspension system of claim 1 further including a wheel bearing and a brake rotor with an inside diameter, and wherein the lower portion of the steering knuckle is pivotally coupled to the lower extension support arm by a lower knuckle joint, with the lower knuckle joint located generally between the inside diameter and the wheel bearing.

13. A steering and suspension system of a vehicle comprising:
 a strut extension member having a strut clamp arm adapted for mounting to a strut assembly, an upper extension support arm extending from the strut clamp arm, an extension fork extending from the strut clamp arm and including a first arm spaced from a second arm, and a lower extension support arm extending from the extension fork, and wherein the first arm includes a first mounting bore and the second arm includes a second mounting bore;
 a steering knuckle having an upper portion pivotally coupled to the upper extension support arm, and a lower portion having a lower knuckle joint including a ball joint mounted to a one of the lower portion of the steering knuckle and the lower extension support arm and a pin extending between and operatively engaging the ball joint and an other of the lower portion of the steering knuckle and the lower extension support arm to pivotally couple the steering knuckle to the strut extension member;
 a lower control arm having an outboard portion with a control arm mounting bore therethrough that is located between and aligned with the first mounting bore and the second mounting bore; and
 a compliant hinge joint including a shaft extending through and operatively engaging the first mounting bore, the second mounting bore, and the control arm mounting bore.

14. The steering and suspension system of claim 13 wherein the compliant hinge joint includes a bushing mounted in the first mounting bore around the shaft and a ball joint, spaced from the bushing, and mounted in the second mounting bore around the shaft.

15. The steering and suspension system of claim 13 wherein the compliant hinge joint includes a first bushing mounted in the first mounting bore around the shaft and a second bushing, spaced from the first bushing, and mounted in the second mounting bore around the shaft.

16. The steering and suspension system of claim 13 wherein the upper portion of the steering knuckle is pivotally coupled to the upper extension support arm by an upper ball joint.

17. The steering and suspension system of claim 13 further including a wheel bearing and a brake rotor with an inside diameter, and wherein the lower knuckle joint is located generally between the inside diameter and the wheel bearing.

18. A compliant hinge for use in a steering and suspension system of a vehicle, with the steering and suspension system including a wheel center of rotation, the compliant hinge comprising:
 a strut extension member having a strut clamp arm adapted for mounting to a strut assembly, and an extension fork extending from the strut clamp arm and including a first arm adapted to be located forward of the wheel center of rotation and a second arm adapted to be located aft of the wheel center of rotation, wherein the first arm includes a first mounting bore and the second arm includes a second mounting bore;
 a lower control arm having an outboard portion with a control arm mounting bore therethrough that is located between and aligned with the first mounting bore and the second mounting bore; and
 a compliant hinge joint including a first joint having a first bushing mounted in the first mounting bore, a second joint spaced from the first joint and located in the second mounting bore, and a shaft extending through the first bushing, the second joint and the mounting bore, the second joint including a ball element located between the shaft and the second mounting bore.

* * * * *